(12) United States Patent
Pfeifle et al.

(10) Patent No.: US 8,620,947 B2
(45) Date of Patent: Dec. 31, 2013

(54) FULL TEXT SEARCH IN NAVIGATION SYSTEMS

(75) Inventors: Martin Pfeifle, Seewald (DE); Jan Richter, Idstein (DE)

(73) Assignee: Navteq B.V., Veldhoven (NL)

( * ) Notice: Subject to any disclaimer, the term of this patent is extended or adjusted under 35 U.S.C. 154(b) by 187 days.

(21) Appl. No.: 13/017,269

(22) Filed: Jan. 31, 2011

(65) Prior Publication Data

US 2011/0196889 A1    Aug. 11, 2011

Related U.S. Application Data

(60) Provisional application No. 61/302,313, filed on Feb. 8, 2010.

(51) Int. Cl.
*G06F 17/30* (2006.01)

(52) U.S. Cl.
USPC .......................................................... 707/769

(58) Field of Classification Search
USPC ................................................... 707/724, 769
See application file for complete search history.

(56) References Cited

U.S. PATENT DOCUMENTS

| | | | |
|---|---|---|---|
| 5,784,059 A | 7/1998 | Morimoto et al. | 345/353 |
| 7,117,434 B2 | 10/2006 | Novaes | 715/513 |
| 7,337,165 B2 | 2/2008 | Baader et al. | 707/3 |
| 7,370,037 B2 | 5/2008 | Doerre et al. | 707/3 |
| 2006/0143171 A1 | 6/2006 | Doerre et al. | 707/5 |
| 2008/0270396 A1 | 10/2008 | Herscovici et al. | 707/6 |
| 2008/0306949 A1 | 12/2008 | Hoernkvist et al. | 707/7 |
| 2011/0093458 A1* | 4/2011 | Zheng et al. | 707/724 |

OTHER PUBLICATIONS

Alexander Markowetz et al., "Design and Implementation of a Geographic Search Engine", 8th International Workshop on the Web and Databases, XP-002427371, Jun. 16-17, 2005.
Chang et al., "Efficient phrase querying with common phrase index", Information Processing & Management, Elsevier, Barking, Great Britain, XP-022499366, ISSN: 0306-4573, pp. 756-769; Aug. 9, 2007.
European Search Report for European Patent Application Serial No. 11153560.5-1225, dated May 3, 2011.
Extended European Search Report, May 3, 2011, pp. 1-6.
Chang, et al. "Efficient phrase querying with common phrase index." ScienceDirect, City University of Hong Kong, Aug. 9, 2007 (12 pages).
Markowetz, et al. "Design and Implementation of a Geographic Search Engine." XP-002427371 (6 pages).

* cited by examiner

*Primary Examiner* — Huawen Peng
(74) *Attorney, Agent, or Firm* — Lempia Summerfield Katz LLC

(57) ABSTRACT

A method and system for full text search for use during destination selection with a navigation system is disclosed. The method partitions a full text search index based on frequently used terms. These frequently used terms are then mapped to dedicated full text search indexes, where each document contains this frequently used term but the term itself is not stored in the index. A relation maps the frequently used terms to the inverted indexes.

20 Claims, 5 Drawing Sheets

FULL TEXT SEARCH IN NAVIGATION SYSTEMS

REFERENCE TO RELATED APPLICATIONS

This application claims the benefit of U.S. Provisional Patent Application No. 61/302,313 filed Feb. 8, 2010 and entitled "FULL TEXT SEARCH IN EMBEDDED NAVIGATION SYSTEMS." The full disclosure of U.S. Provisional Patent Application Ser. No. 61/302,313 is incorporated herein by reference.

FIELD

The present invention relates generally to full text search, and more particularly, relates to full text search in navigation systems.

BACKGROUND

Full text search (FTS) systems search for relevant documents based on key words entered by a system user. The user enters a set of terms, referred to as tokens, and the FTS system finds documents containing all of the terms in the set. In order to support queries efficiently, the FTS system typically uses inverted indexes. For example, Lucene (described at http://lucene.apache.org/) and SQLite's FTS module (described at http://www.sqlite.org/cvstrac/wiki?p=FtsUsage) are both FTS systems that use inverted indexes.

An inverted index assigns a set of document identifiers to each token. The document identifiers are associated with documents that include the token at least once. Upon receiving a search request, the FTS system selects the set of document identifiers for each token in the request and then compares the document sets to each other. If a document identifier is contained in all document sets, the FTS system provides the document identifier in a result set of all identifiers contained in all document sets.

From a logical point of view, the inverted index can be regarded as a relation InvertedIndex(Term, DocID) with an combined index on Term and DocId. The inverted index allows the FTS system to efficiently execute queries such as Query 1:

SELECT DocID FROM InvertedIndex WHERE Term='Neuschwanstein'

If only a small number of documents belong to the result set, the FTS system's performance is generally good. If a user searches for documents that contain two terms 'Bavaria' and 'Neuschwanstein,' the FTS system executes a query such as Query 2:

SELECT DocID FROM InvertedIndex WHERE Term='Bavaria'
INTERSECT
SELECT DocID FROM InvertedIndex WHERE Term='Neuschwanstein'

Assume a database has one million documents containing the term 'Bavaria' and ten documents containing the term 'Neuschwanstein.' Although the size of the result set for Query 2 is equal to the size of the result set for Query 1, Query 2 takes much longer as the FTS system has to iterate over one entire million document identifiers belonging to the term 'Bavaria.'

Another problem with FTS systems occurs when a search request includes a non-selective token. A non-selective token is a token found in most documents, such as the so called stop-words like "and," "or," and "the." For example, if a search request includes the two tokens "NAVTEQ" and "the," there may be one hundred documents in the database containing the token "NAVTEQ" and one million documents containing "the." In order to generate the result set, the one hundred document identifiers associated with the documents including the term "NAVTEQ" are compared to the one million document identifiers associated with the documents including the term "the," which may take a long time. Therefore, some FTS systems do not include stop-words like "the" in the inverted index.

However, some non-selective token are more meaningful than others. Thus, it would be beneficial to have a more efficient way to handle those non-selective but nevertheless meaningful terms when performing a full text search.

SUMMARY

A method and system for performing a full text search that saves secondary storage and speeds up full text search queries is described. The method partitions the full text search index based on frequently used terms. These frequently used terms are then mapped to dedicated full text search indexes where each document contains this frequently used term, but the term itself is not stored in the index. An additional relation maps the frequently used terms to the inverted indexes. This method saves space as the document list of the frequently used tokens is not explicitly stored in the database. A full text search query first checks based on the mapping relation which of the entered tokens is included in what index. Each index is queried with all entered tokens except those query tokens that are explicitly included in the mapping table.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Navigation System

Figure 1:
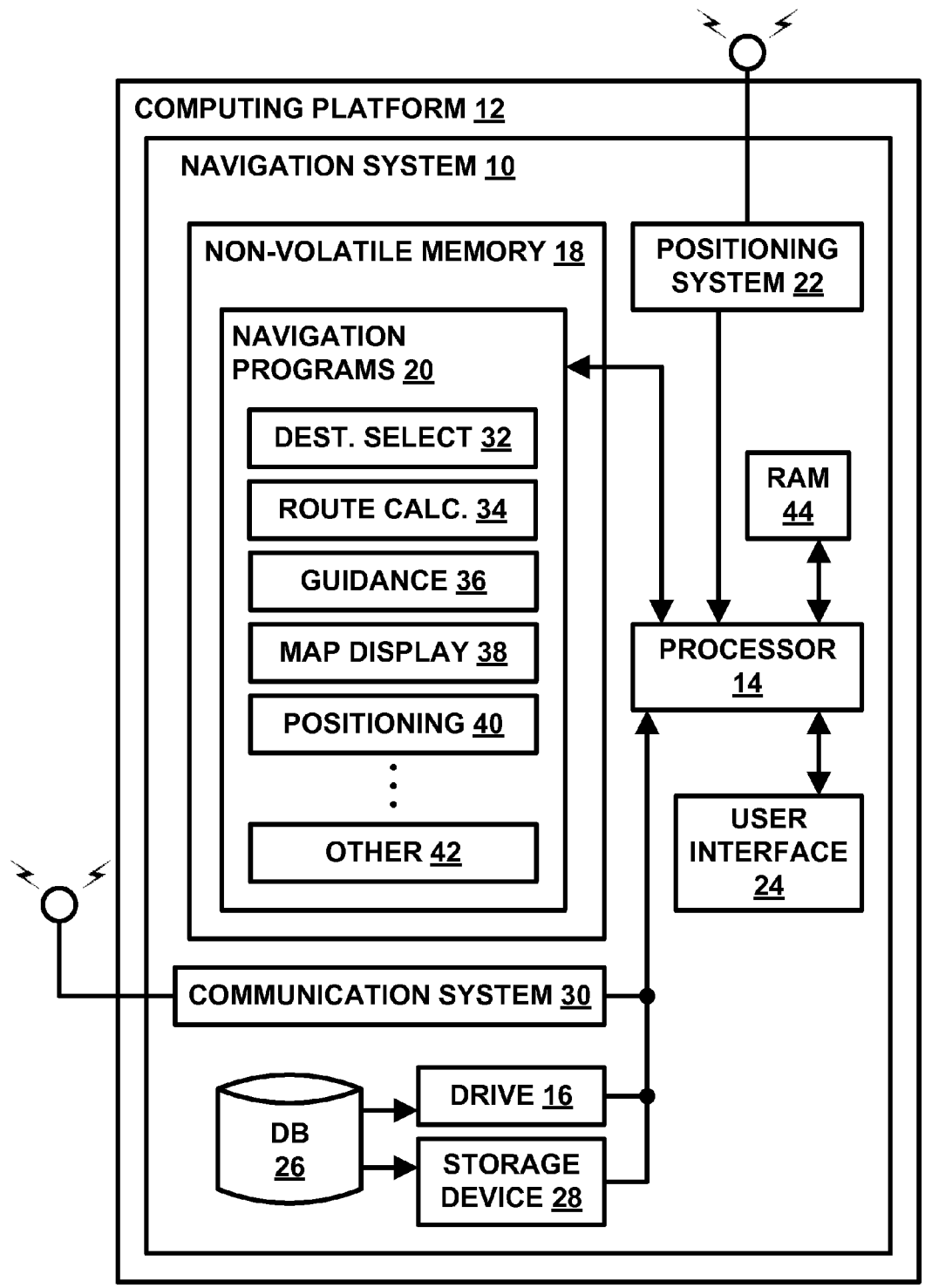
FIG. 1 is a block diagram depicting a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion of the geographic database 26 is stored. In another embodiment, the geographic database 26 is stored on a hard disk. In one embodiment, the geographic database 26 may be a geographic database published by NAVTEQ North America, LLC of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 44 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include destination selection 32 (identifying one or more places to be used as a destination based on user input), route calculation 34 (determining a route from an origin to a destination), route guidance 36 (providing detailed directions for reaching a destination), map display 38, and positioning 40 (e.g., map matching). Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
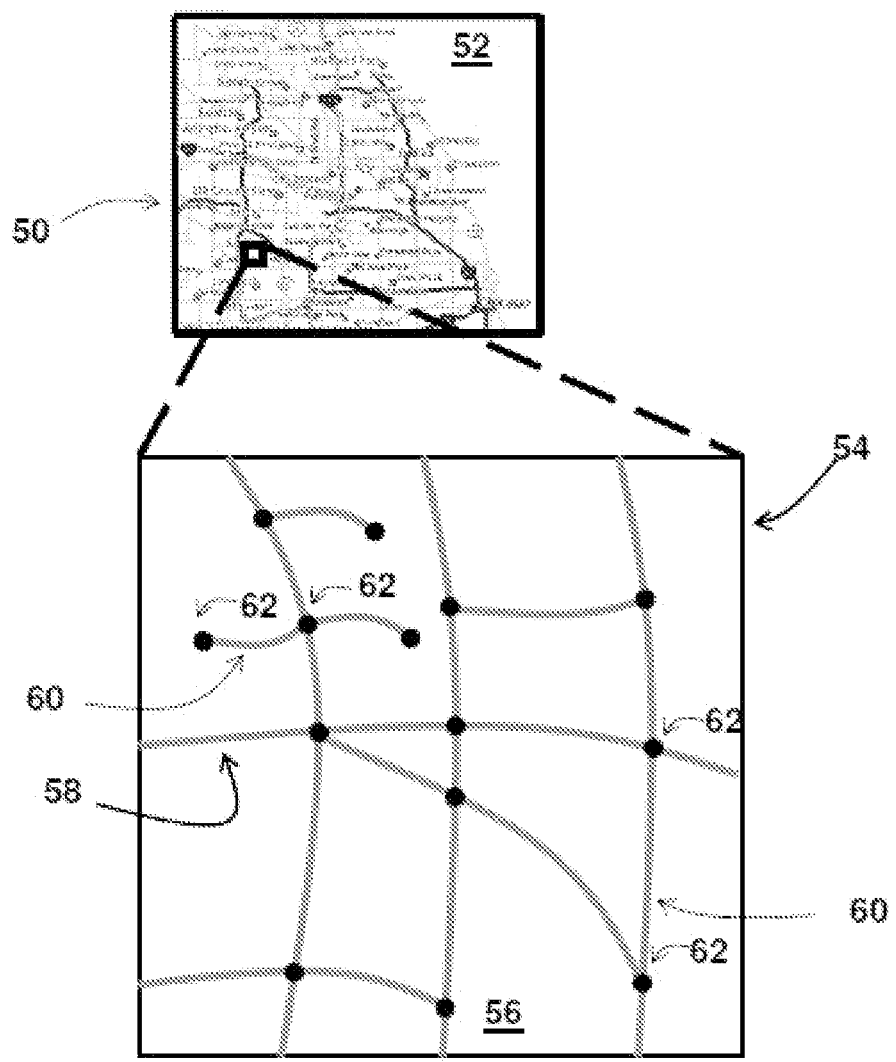
FIG. 2 shows a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
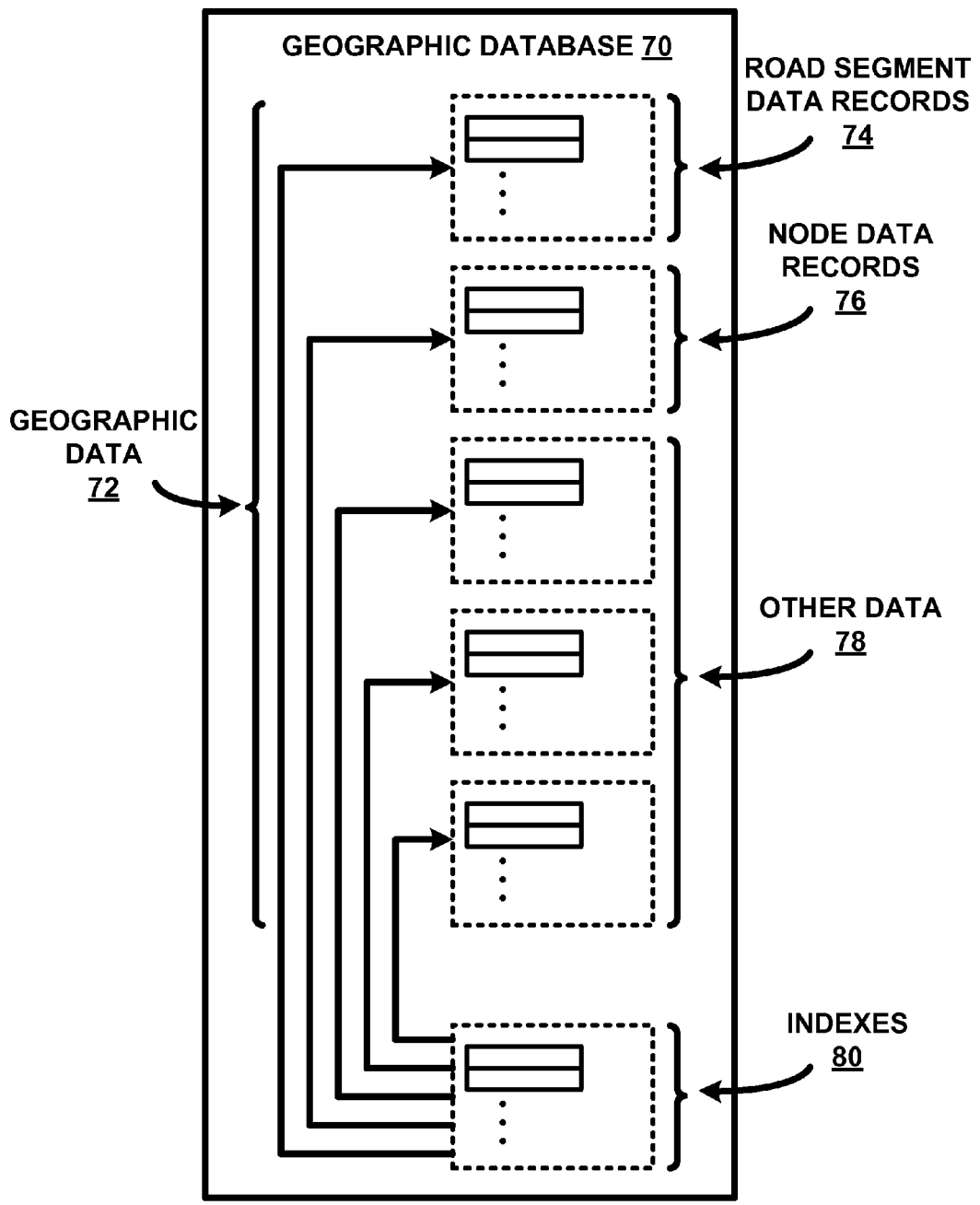
FIG. 3 is a block diagram of a geographic database that represents the geographic region of FIG. 2, according to an example.

Referring to FIG. 3, a geographic database 70 contains data 72 that represents some of the physical geographic features in the geographic region (52 in FIG. 2). The data 72 contained in the geographic database 70 includes data that represent the road network 58. In the embodiment of FIG. 3, the geographic database 70 that represents the geographic region 52 contains at least one database record 74 (also referred to as "entity" or "entry") for each road segment 60 in the geographic region 52 in FIG. 2. The road segment data record 74 may include a segment ID by which the data record can be identified in the geographic database 70.

Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The geographic database 70 also includes indexes 80. The indexes 80 may include various types of indexes that relate the different types of data to each other or that relate to other aspects of the data contained in the geographic database 70.

III. Full Text Search System

Figure 4:
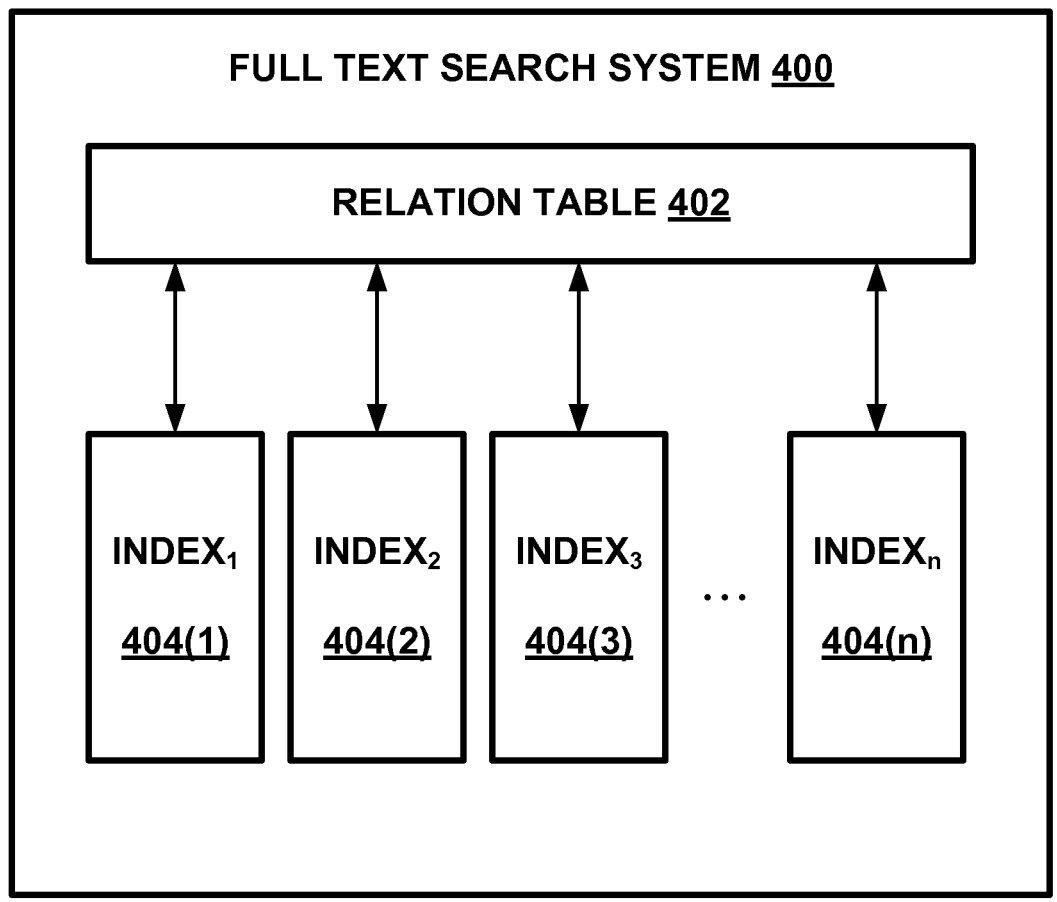
FIG. 4 is a block diagram of a full text search system, according to an example.

FIG. 4 is a block diagram of a full text search system 400. The FTS system 400 may be located in the navigation system 10 or other system. In the navigation system 10 example, some or all of the FTS system 400 may be included as part of the destination selection program 32.

The FTS system 400 includes a relation table 402 and a plurality of search indexes 404. The search indexes 404 are inverted indexes, where each search index 404 is assigned one or more tokens that occur in each document managed by the search index 404. Preferably, the tokens are frequently used terms. A document may be a computer-stored document or entry in a database. The relation table 402 stores a relation (e.g., Token2SearchIndex (Token, IndexID)) that identifies what token is associated with which search index 404.

If a relation (Token_i, Index_j) is stored in the relation table 402, the token itself (Token_i) is not stored in the index 404 (Index_j). The FTS system 400 assumes that all documents stored in the index 404 (Index_j) contain the token (Token_i). As a result, the storage of an explicit document list of tokens is avoided, saving secondary storage space.

One of the search indexes 404 may be a default index that does not have assigned tokens. During a full text search, the FTS system 400 queries the default index for all tokens entered by the user.

As an example, assume the relation table 402 contains the data in Table 1.

TABLE 1

| "" | DefaultIndex |
|---|---|
| "Bavaria" | BavariaIndex |
| "Austria" | AustriaIndex |

If a user enters the tokens "Bavaria" and "Neuschwanstein," the FTS system 400 uses both tokens for retrieving document identifiers stored in the DefaultIndex; the token "Neuschwanstein" for retrieving document identifiers stored in the BavariaIndex; and both tokens for retrieving document identifiers stored in the AustriaIndex. Note that the FTS system 400 does not use the token "Bavaria" for retrieving document identifiers stored in the BavariaIndex because the FTS system 400 assumes that all documents managed by the BavariaIndex include the token "Bavaria." Because the token "Neuschwanstein" is not listed in the relation table 402, the FTS system 400 searches all of the search indexes 404 for the token "Neuschwanstein." The FTS system 400 includes document identifiers of all three indexes in the result set.

As another example, assume the relation table 402 contains the data in Table 2.

TABLE 2

| "" | DefaultIndex |
|---|---|
| "Bavaria" | Bavaria1Index |
| "Germany" | Bavaria1Index |
| "Bavaria" | Bavaria2Index |

In this example, the Bavaria1Index manages documents that contain both "Bavaria" and "Germany" and the Bavaria2Index manages documents that contain "Bavaria," but not necessarily "Germany." If a user enters the tokens "Germany" and "Neuschwanstein," the FTS system 400 uses both tokens for retrieving document identifiers stored in the DefaultIndex and the Bavaria2Index, and only the token "Neuschwanstein" for retrieving document identifiers stored in the Bavaria1Index.

Figure 5:
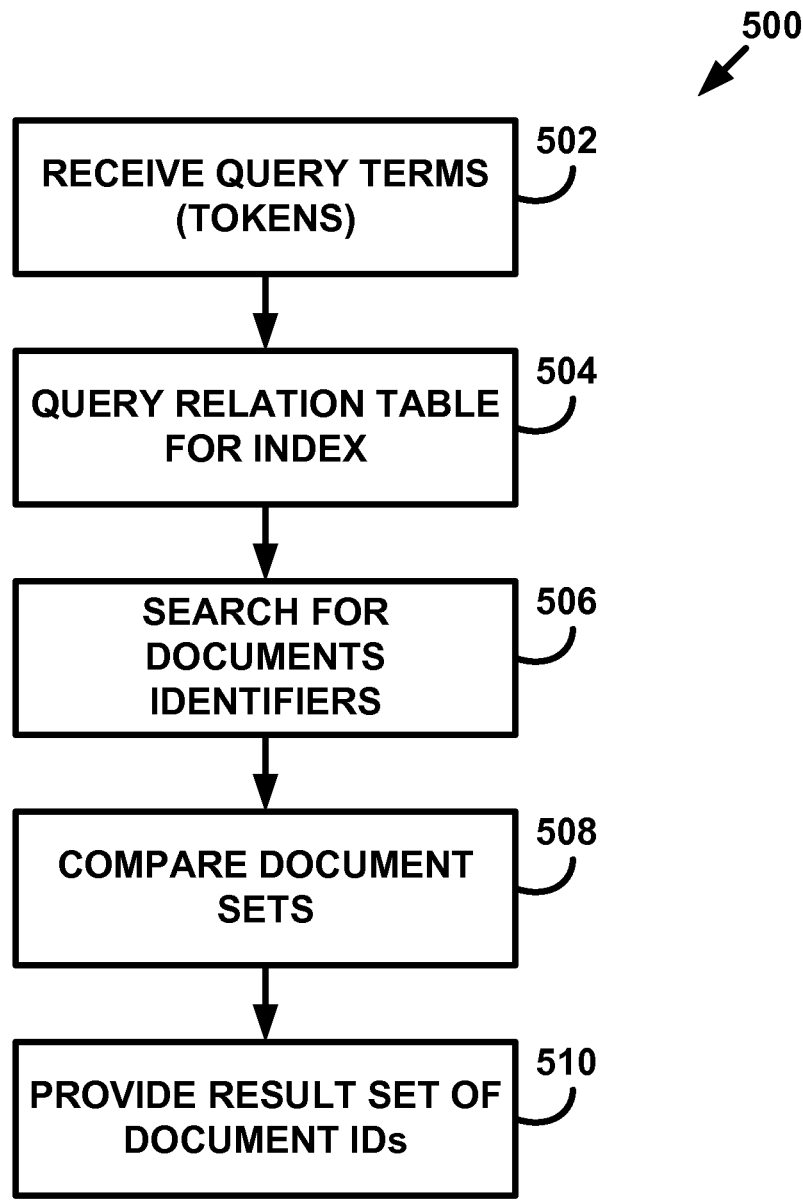
FIG. 5 is a flow diagram of a method of performing a full text search using the full text search system depicted in FIG. 4, according to an example.

FIG. 5 is a flow diagram of a method 500 for performing a full text search using the FTS system 400. At block 502, the FTS system 400 receives query terms from a user. For example, the user may be a user of the navigation system 10 and the query terms are words used to find a destination (e.g., street name, point of interest name). The user may enter the query terms via the user interface 24. For the remainder of the method 500 description, these query terms are referred to as tokens.

At block 504, the FTS system 400 queries the relation table 402 to determine if any of the tokens are associated with an index 404. The indexes 404 are assigned to frequently used tokens. In the destination selection example, the frequently used tokens may be names of countries, names of cities, popular points of interests, and so on.

At block 506, the FTS system 400 searches indexes for document identifiers. The FTS system 400 uses the results of the query performed at block 504 to determine which indexes 404 to search. For a particular token, the FTS system 400 only searches for document identifiers in the search indexes 404 that are not associated with the token.

For example, if a token is associated with the index 404(1), the FTS system 400 searches for document identifiers only in the non-associated indexes 404(2)-404(n). As another example, if the token is associated with indexes 404(1) and 404(2), the FTS system 400 searches for document identifiers only in the non-associated indexes 404(3)-404(n). As a result of the searches, the FTS system 400 generates a document set per token, which is a list of document identifiers associated with documents that include the token at least once.

At block 508, the FTS system 400 compares the document sets for each token received at block 502. As a result of this comparison, the FTS system 400 generates a result set, which is a list of document identifiers that are listed in all document sets.

At block 510, the FTS system 400 provides the result set of document identifiers. The FTS system 400 may provide the result set to another system, which then retrieves the documents and provides the documents to the user. Alternatively, the FTS system 400 may retrieve the documents associated with the document identifier and then provide the documents to the user.

The FTS system 400 and the method 500 are especially useful in an embedded system with limited secondary storage and processing capability. One example of an embedded system is a navigation system. The following section describes examples of how the FTS system 400 and the method 500 may be used in a navigation system during destination selection. However, it is understood that the FTS system 400 and the method 500 may be used in navigation systems for other full text search applications and in other systems that perform full text searches.

IV. Navigation System Examples

The FTS system 400 may be used in the navigation system 10 as part of destination selection. In this application of the FTS system 400, the documents may be POIs, streets, intersections, and other potential destinations stored in the geographic database 26. While the following description uses SQLite (www.sqlite.org) and its full text search extension FTS3 (http://www.sqlite.org/cvstrac/wiki?p=FtsUsage), it is understood that other search engines may be used. In FTS3, each FTS index is modeled as a virtual table. The virtual table VT(id, att1, . . . , attn) contains a document identifier "id" and attributes "att1, . . . , attn." FTS3 allows a user to retrieve documents where query tokens occur in any of the attributes or in specific attributes.

a. Streets

To manage streets, the FTS system 400 may use a virtual table (VT_Streets) containing the following columns: VT_Streets(StreetID, CountryName, CityName, StreetName, OtherTokens). For example, if the virtual table includes the streets in Europe and a user enters "Volger" and "Deutschland," the FTS system 400 generates the following query.

SELECT * FROM VT_Streets WHERE VT_Streets match "Deutschland Volger"

Such a query takes a thousand times longer than the following query.

SELECT * FROM VT_Streets WHERE VT_Streets match "Volger"

If the user explicitly is able to tell the FTS system 400 that the StreetName is "Volger" and that the CountryName is "Deutschland," the query could also be as follows.

SELECT * FROM VT_Streets WHERE VT_Streets match "CountryName: Deutschland Streetname: Volger"

But this query would also take a thousand times as long as the following query.

SELECT * FROM VT_Streets WHERE VT_Streets match "Streetname: Volger"

Assume now that the FTS system 400 has a Token2VT (Token, ColumnName, VirtualTable) relation table 402. The Token2VT relation table 402 may be populated as follows.

| Token2VT | | |
| --- | --- | --- |
| Token | ColumnName | VirtualTable |
| "" | "" | VT_Streets |
| "Deutschland" | "CountryName" | VT_Germany_Streets |
| "Hamburg" | "CityName" | VT_Hamburg_Streets |
| "Deutschland" | "CountryName" | VT_Hamburg_Streets |
| "Hauptstrasse" | "Streetname" | VT_HauptStrasse_Streets |
| "Deutschland" | "CountryName" | VT_HauptStrasse_Streets |
| . . . | | |

Each of the virtual tables has the same schema as VT_Streets previously described. The street (4711, "Deutschland", "Hamburg", "Hauptstrasse") may be stored in either VT_Hamburg_Streets as (4711, " ", " ", "Hauptstrasse", " ") or VT_Hauptstrasse_Streets as (4711, " ", "Hamburg", " ", " "). Both approaches provide correct results for all possible queries.

If a user enters arbitrary tokens without an indication for which column they should be applied, the FTS system 400 first determines what tokens should be used for which index. In the example with the tokens "Volger" and "Deutschland," the FTS system 400 generates the following query.

SELECT DocID FROM VT_Streets WHERE VT_Streets match
"Deutschland Volger"
UNION ALL
SELECT DocID FROM VT_Germany_Streets WHERE
VT_Germany_Streets match "Volger"
UNION ALL
SELECT DocID FROM VT_Hamburg_Streets WHERE
VT_Hamburg_Streets match "Volger"
UNION ALL
SELECT DocID FROM VT_HauptStrasse_Streets WHERE
VT_HauptStrasse_Streets match "Volger"

Note that the first part of the query, i.e., SELECT DocID FROM VT_Streets WHERE VT_Streets match "Deutschland Volger," is executed efficiently as most or all documents containing "Deutschland" as country name are stored in other indexes. Nevertheless, the first part of the query may still return results if, for instance, "Deutschland" would be a city name in a country like "Austria" and this city had a street called "Volger."

The record (StreetID, "Deutschland", "Sulzbach", "Otto-Volger-Strasse", " "), which was originally stored in the VT_Streets table, is now stored as (StreetID, " ", "Sulzbach", "Otto-Volger-Strasse", " ") in VT_Germany_Streets. Note that this approach not only executes queries more efficiently, but also saves secondary storage space.

If a user searches for a street in Deutschland called Deutschland, the FTS system 400 also uses the Deutschland token in the Germany street index. The Token2VT relation table 402 specifies that the Deutschland token is only excluded for the Country name column, but not if the token is used as a street name. Thus, the resulting query is as follows.

SELECT DocID FROM VT_Streets WHERE VT_Streets match
"Streetname: Deutschland"
UNION ALL
SELECT DocID FROM VT_Germany_Streets WHERE
VT_Germany_Streets match "Streetname: Deutschland"

-continued

```
UNION ALL
SELECT DocID FROM VT_Hamburg_Streets WHERE
VT_Hamburg_Streets match "Streetname: Deutschland"
UNION ALL
SELECT DocID FROM VT_HauptStrasse_Streets WHERE
VT_HauptStrasse_Streets match "Streetname: Deutschland"
```

Exonyms and diacritic character replacement may also be managed via the FTS system 400. An exonym is place name used by foreigners instead of the native-language version used by its inhabitants, such as Moscow in English for the city called Moskva in Russian. A diacritic is an ancillary glyph added to a letter, sometimes referred to as an accent. Diacritic character replacement includes substituting the diacritic with another letter; for example, Munchen becomes Muenchen.

Exonyms may be stored in the column SearchTokens assigned to each document. In this example, the street Otto-Volger-Strasse in Sulzbach is stored as (StreetID, "Deutschland", "Sulzbach", "Otto-Volger-Strasse", "Germany Allemagne"), where Germany and Allemagne are exonyms of Deutschland. To reduce the amount of secondary storage space needed to store document identifiers for all exonyms, the following example Token2VT relation table 402 may be used for Europe.

| Token2VT | | |
|---|---|---|
| Token | ColumnName | VirtualTable |
| "" | "" | VT_Streets |
| "Deutschland" | "CountryName" | VT_Germany_Streets |
| "Germany" | "CountryName" | VT_Germany_Streets |
| "Allemagne" | "CountryName" | VT_Germany_Streets |
| ... | ... | ... |
| "France" | "CountryName" | VT_France_Streets |
| "Frankreich" | "CountryName" | VT_France_Streets |
| ... | ... | ... |

If a user enters "Volger" and "Allemagne," the FTS system 400 generates the following query.

```
SELECT DocID FROM VT_Streets WHERE VT_Streets match
"Allemagne Volger"
UNION ALL
SELECT DocID FROM VT_Germany_Streets WHERE
VT_Germany_Streets match "Volger"
UNION ALL
SELECT DocID FROM VT_Streets WHERE VT_France_Streets match
"Allemagne Volger"
```

The record may be stored unchanged in the table VT_Germany_Streets as (StreetID, " ", "Sulzbach", "Otto-Volger-Strasse", " "). The FTS system 400 may also include metadata information in the result set. For instance, the above query could also be generated as follows.

```
SELECT DocID, CountryName,CityName,StreetName FROM
VT_Streets WHERE VT_Streets match "Allemagne Volger"
UNION ALL
SELECT DocID, Allemagne,CityName,StreetName FROM
VT_Germany_Streets WHERE VT_Germany_Streets match "Volger"
UNION ALL
SELECT DocID, CountryName,CityName,StreetName FROM
VT_Streets WHERE VT_France_Streets match "Allemagne Volger"
```

Thus, the search strings that are not used for querying are directly populated into the result set, i.e., the projection of the SQL command.

In another example, the Token2VT relation table 402 may be formatted as follows.

| Token2VT | | |
|---|---|---|
| Token | ColumnName | VirtualTable |
| "" | "" | VT_Streets |
| "Deutschland" | "CountryName" | VT_Germany_Streets |
| "Germany" | "CountryName" | VT_Germany_Streets |
| "Allemagne" | "CountryName" | VT_Germany_Streets |
| ... | ... | ... |
| "Berlin" | "CityName" | VT_Berlin_Streets |
| "Berlino" | "CityName" | VT_Berlin_Streets |
| "Deutschland" | "CountryName" | VT_Berlin_Streets |
| "Germany" | "CountryName" | VT_Berlin_Streets |
| "Allemagne" | "CountryName" | VT_Berlin_Streets |
| "Germany" | "CountryName" | VT_Berlin_Streets |
| ... | | |

If the user enters "Germany" and "Kurfürstendamm," the FTS system 400 may generate the query as follows.

```
SELECT DocID FROM VT_Streets WHERE VT_Streets match
"Germany Kurfürstendamm"
UNION ALL
SELECT DocID FROM VT_Germany_Streets WHERE
VT_Germany_Streets match "Kurfürstendamm"
UNION ALL
SELECT DocID FROM VT_Streets WHERE VT_Berlin_Streets
match "Kurfürstendamm"
```

The following example Token2VT relation table 402 may be used for diacritic character replacement.

| Token2VT | | |
|---|---|---|
| Token | ColumnName | VirtualTable |
| "" | "" | VT_Streets |
| "Deutschland" | "CountryName" | VT_Germany_Munich_Streets |
| "Germany" | "CountryName" | VT_Germany_Munich_Streets |
| "Allemagne" | "CountryName" | VT_Germany_Munich_Streets |
| "Munchen" | "CityName" | VT_Germany_Munich_Streets |
| "Muenchen" | "CityName" | VT_Germany_Munich_Streets |
| "Munchen" | "CityName" | VT_Germany_Munich_Streets |
| "Munich" | "CityName" | VT_Germany_Munich_Streets |
| ... | | |

It is possible to cluster data in the compiler process and create an optimized Token2VT relation table 402. Note that the number of virtual tables should be minimized to avoid impacting query performance. The compiler determines a useful compromise between number of inverted indexes and overall database size. For example, the compiler may store all countries along with their exonyms and a selected number of cities along with their exonyms in the Token2VT relation table 402.

b. Intersections

Similar principles can be applied to intersections. A document describing an intersection may be formatted as follows.

VT_Intersections(IntersectionID, Country, State, Street1, Street2, SearchStrings)

An example VT_Intersections table is provided as follows.

| Intersection ID | Country | State | City | Street1 | Street2 | Search Strings |
|---|---|---|---|---|---|---|
| 4711 | USA | California | Los Angeles | Jefferson | Madison | "" |
| 4712 | USA | California | Los Angeles | Jefferson | Washington | "" |
| 6000 | USA | California | San Diego | Sanchez | Alfredo | "" |
| 999883 | USA | Florida | Miami | Jefferson | Washington | "" |
| 999884 | USA | Florida | Miami | Franklin | Frankfurt | "" |

The VT_Intersections table may include millions of records. If a user enters "USA" and "Jefferson," the result set includes at least the document identifiers 4711, 4712, and 999883.

By using a Token2VT relation table 402 that contains two or more records for each state reduces the secondary storage space required and the time for the FTS system 400 to generate a results set. An example Token2VT relation table 402 for intersections is provided as follows.

| Token | ColumnName | VirtualTable |
|---|---|---|
| "" | "" | VT_Streets |
| "USA" | "CountryName" | VT_California_Intersections |
| "California" | "StateName" | VT_California_Intersections |
| "USA" | "CountryName" | VT_Florida_Intersections |
| "Florida" | "StateName" | VT_Florida_Intersections |
| "USA" | "CountryName" | VT_LosAngelos_Intersections |
| "California" | "StateName" | VT_LosAngelos_Intersections |
| "Los Angelos" | "CityName" | VT_LosAngelos_Intersections |

The records of the VT_Intersection table may be stored as follows:

VT_Intersections

| Intersection ID | Country | State | City | Street1 | Street2 | Search Strings |
|---|---|---|---|---|---|---|

VT_California_Intersections

| IntersectionID | Country | State | City | Street1 | Street2 | Search Strings |
|---|---|---|---|---|---|---|
| 6000 | "" | "" | San Diego | Sanchez | Alfredo | "" |

VT_LosAngelos_Intersections

| Intersection-ID | Country | State | City | Street1 | Street2 | Search Strings |
|---|---|---|---|---|---|---|
| 4711 | "" | "" | "" | Jefferson | Madison | "" |
| 4712 | "" | "" | "" | Jefferson | Washington | "" |

VT_Florida_Intersections

| Inter-sectionID | Country | State | City | Street1 | Street2 | Search Strings |
|---|---|---|---|---|---|---|
| 999883 | "" | "" | Miami | Jefferson | Washington | "" |
| 999884 | "" | "" | Miami | Franklin | Frankfurt | "" |

If a user enters the search strings "USA," "Miami," "Jefferson," the FTS system 400 generates the following query.

```
SELECT DocID, Country,State, City,Street1, Street2 FROM
VT_Intersections WHERE VT_Intersections
match "USA Miami Jefferson"
UNION ALL
SELECT DocID,"USA", "California", City,Street1, Street2 FROM
VT_California_Intersections WHERE VT_California_Intersections
match "Miami Jefferson"
UNION UNION ALL
SELECT DocID,"USA", "California", "Los Angelos",Street1,
Street2 FROM VT_LosAngeles_Intersections WHERE
VT_LosAngelos_Intersections match "Miami Jefferson"
UNION ALL
SELECT DocID,"USA", "Florida",City,Street1, Street2 FROM
VT_Florida_Intersections WHERE VT_Florida_Intersections
match "Miami Jefferson"
``` c. Points of Interest (POIs)

Similar principles can be applied to POIs. A document describing a POI may be formatted as follows.

VT_POIs(POIID, Name, Country, Street, Category, SearchStrings)

An example VT_POIs table is provided as follows.

| | | | VT_POIs | | | |
|---|---|---|---|---|---|---|
| POIID | Name | Country | City | Street | Category | Search Strings |
| 4711 | Mc Donald | Deutschland | München | Leopoldstrasse | Restaurant | "" |
| 4712 | Adler | Deutschland | München | Leopoldstrasse | Restaurant | "" |
| 4713 | Mc Donald | Deutschland | Hamburg | Hauptstrasse | Restaurant | "" |
| ... | | | | | | |

An example Token2VT relation table 402 for POIs that groups categories and countries is provided as follows.

| Token2VT | | |
|---|---|---|
| Token | ColumnName | VirtualTable |
| "" | "" | VT_POIs |
| "Deutschland" | "Country" | VT_POI_Deutschland_Restaurants |
| "Germany" | "Country" | VT_POI_Deutschland_Restaurants |
| "Restaurant" | "Category" | VT_POI_Deutschland_Restaurants |
| ... | | |

If a user enters the search strings "Germany," "Munchen," and "Restaurant," the FTS system 400 generates the following query.

```
SELECT DocID, FROM VT_POIs WHERE VT_POIs match "Germany Restaurant München"
UNION ALL
SELECT DocID FROM VT_POI_Deutschland_Restaurants WHERE VT_POI_Deutschland_Restaurants match "München"
```

V. Conclusions

The FTS system 400 and the method 500 save secondary storage and increase query processing speed. As a result, the FTS system 400 and the method 500 are especially beneficial during destination selection with a navigation system. However, it is understood that the FTS system 400 and the method 500 may be used in navigation systems for other full text search applications and in other systems that perform full text searches.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer-implemented method for performing full text search, comprising:
   receiving search terms to be included in a full text search;
   querying a relation table including inverted indexes for a destination, wherein a frequently used search term is mapped to each of the inverted indexes, the destination is included in at least one document managed by the respective inverted index, and the at least one frequently used search term is not stored in the respective inverted index;
   determining whether the received search terms are associated, as frequently used search terms, with an inverted index;
   searching for document identifiers in the inverted indexes that are not associated with the frequently used search terms;
   generating a document set per received search term that includes a list of document identifiers;
   comparing the document sets to identify what document identifiers are located in all document sets; and
   providing a result set of document identifiers that are located in all document sets.

2. The method of claim 1, wherein the search terms are terms used for selecting a destination.

3. The method of claim 2, wherein the search term includes a street name.

4. The method of claim 2, wherein the search term includes at least two street names of streets that form an intersection.

5. The method of claim 2, wherein the search term includes a point of interest name.

6. The method of claim 1, wherein the relation table includes exonyms.

7. The method of claim 1, wherein the relation table includes diacritic character replacements.

8. The method of claim 1, wherein the full text search is a single level search.

9. A computer-implemented method for destination selection with a navigation system, comprising:
   receiving information regarding a destination comprising a broad place name and a narrow place name;
   querying a relation table that associates search terms to inverted indexes;
   determining whether the broad place name of the destination information is a frequently used search term associated with an inverted index;
   identifying that the frequently used search term is not listed in the inverted index, wherein the inverted index includes documents associated with the broad place name of the destination;
   searching for document identifiers in inverted indexes that are not associated with the broad place name of the destination information;
   generating a document set for each searched inverted index, wherein the document set includes a list of document identifiers associated with documents that include the narrow place name of the destination information;
   comparing the document sets to identify what document identifiers are located in all document sets; and
   providing a result set of document identifiers that are located in all document sets.

10. The method of claim 9, wherein the destination information includes a street name.

11. The method of claim 9, wherein the destination information includes at least two street names of streets that form an intersection.

12. The method of claim 9, wherein the destination information includes a point of interest name.

13. The method of claim 9, wherein the relation table includes exonyms.

14. The method of claim 9, wherein the relation table includes diacritic character replacements.

15. A full text search system, comprising:
a memory configured to store a plurality of inverted indexes associated with at least one search term, wherein the at least one search term includes a destination and the inverted index lists documents sets each including the at least one search term, wherein the at least one search term is not included in the inverted index; and
a processor configured to receive a search request,
wherein the memory is configured to store a relation table that associates search terms to the plurality of inverted indexes, wherein the relation table is queried upon receiving the search request to identify what search terms in the search request are associated with an inverted index, and wherein the full text search system searches for document identifiers in inverted indexes that are not associated with the search terms in the search request,
wherein the processor is configured to compare document sets for the search terms in the search request to identify at least one document identifier included in the document sets and provide a result set of the at least one document identifier included in all document sets.

16. The system of claim 15, wherein the relation table includes at least one column found in documents associated with the document identifiers.

17. The system of claim 16, wherein the column includes country name data or city name data.

18. The system of claim 16, wherein the column includes street name data.

19. The system of claim 17, wherein the column includes point of interest category data.

20. The system of claim 15, wherein the at least one search term associated with an inverted index is a frequently used term in a geographic database.

* * * * *